US010562538B2

(12) United States Patent
Lan et al.

(10) Patent No.: US 10,562,538 B2
(45) Date of Patent: Feb. 18, 2020

(54) OBJECT INTERACTION PREDICTION SYSTEMS AND METHODS FOR AUTONOMOUS VEHICLES

(71) Applicant: UATC, LLC, San Francisco, CA (US)

(72) Inventors: Tian Lan, Pittsburgh, PA (US); Galen Clark Haynes, Pittsburgh, PA (US); Alexander David Styler, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 32 days.

(21) Appl. No.: 15/848,564

(22) Filed: Dec. 20, 2017

(65) Prior Publication Data

US 2019/0152490 A1 May 23, 2019

Related U.S. Application Data

(60) Provisional application No. 62/589,951, filed on Nov. 22, 2017.

(51) Int. Cl.
  *B60W 50/00* (2006.01)
  *B60W 30/095* (2012.01)
  (Continued)

(52) U.S. Cl.
  CPC .... *B60W 50/0097* (2013.01); *B60W 30/0953* (2013.01); *B60W 30/0956* (2013.01);
  (Continued)

(58) Field of Classification Search
  CPC .............................................. B60W 50/0097
  See application file for complete search history.

(56) References Cited

U.S. PATENT DOCUMENTS 9,248,834 B1   2/2016 Ferguson et al.
9,501,932 B2 * 11/2016 Sakai ..................... G08G 1/161
(Continued)

FOREIGN PATENT DOCUMENTS

DE     102013005362     10/2013
EP         2923911      9/2015

OTHER PUBLICATIONS

International Search Report and Written Opinion for Application No. PCT/US2018/062171, dated Feb. 18, 2019, 12 pages.

*Primary Examiner* — Alex C Dunn
(74) *Attorney, Agent, or Firm* — Dority & Manning, P.A.

(57) ABSTRACT

Systems and methods for determining object motion and controlling autonomous vehicles are provided. In one example embodiment, a computing system includes processor(s) and one or more tangible, non-transitory, computer readable media that collectively store instructions that when executed by the processor(s) cause the computing system to perform operations. The operations include obtaining data associated with a first object and one or more second objects within a surrounding environment of an autonomous vehicle. The operations include determining an interaction between the first object and the one or more second objects based at least in part on the data. The operations include determining one or more predicted trajectories of the first object within the surrounding environment based at least in part on the interaction between the first object and the one or more second objects. The operations include outputting data indicative of the one or more predicted trajectories of the first object.

26 Claims, 6 Drawing Sheets

(51) Int. Cl.
  *G06K 9/00* (2006.01)
  *G05D 1/00* (2006.01)
  *G05D 1/02* (2020.01)
  *G06T 7/20* (2017.01)

(52) U.S. Cl.
  CPC ......... *G05D 1/0088* (2013.01); *G05D 1/0214* (2013.01); *G06K 9/00805* (2013.01); *G06K 9/00825* (2013.01); *G06T 7/20* (2013.01); *B60W 2550/10* (2013.01); *G05D 2201/0213* (2013.01); *G06T 2207/30261* (2013.01)

(56) References Cited

U.S. PATENT DOCUMENTS

| | | | |
|---|---|---|---|
| 2015/0346727 A1* | 12/2015 | Ramanujam | B62D 15/0285 701/23 |
| 2016/0107691 A1* | 4/2016 | Goldmann | B62D 15/0285 701/41 |
| 2016/0264132 A1* | 9/2016 | Paul | B60W 30/06 |
| 2017/0032674 A1* | 2/2017 | Baasch | G05D 1/0276 |
| 2017/0132482 A1* | 5/2017 | Kim | G08G 1/168 |
| 2017/0309184 A1* | 10/2017 | Nordbruch | G08G 1/04 |
| 2018/0374341 A1* | 12/2018 | Branson | G05D 1/021 |
| 2019/0024430 A1* | 1/2019 | Jeromin | G06K 9/00805 |
| 2019/0054927 A1* | 2/2019 | Hayakawa | B62D 15/0285 |
| 2019/0101924 A1* | 4/2019 | Styler | G05D 1/0214 |
| 2019/0129436 A1* | 5/2019 | Sun | G06N 20/00 |

* cited by examiner

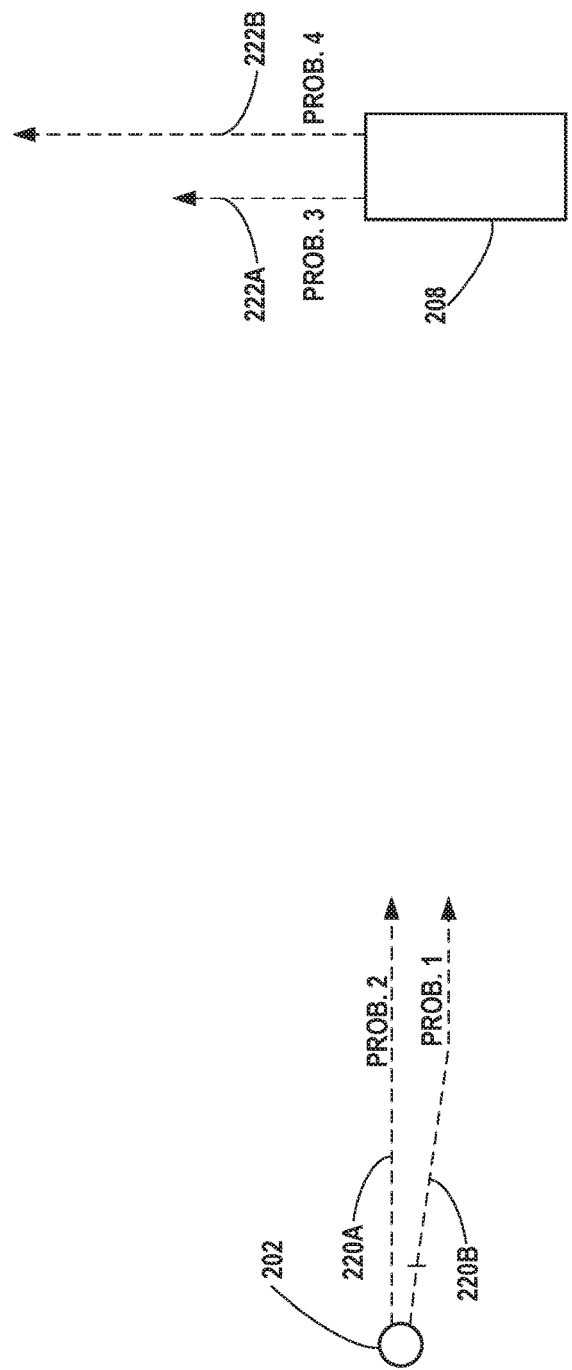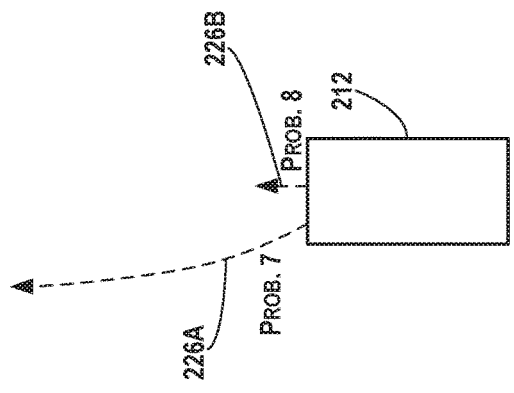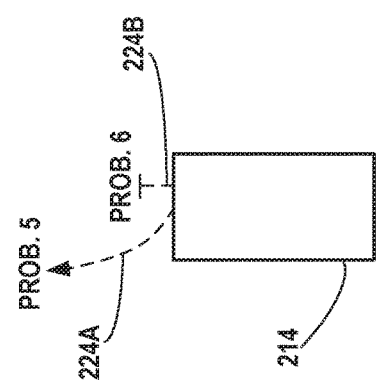

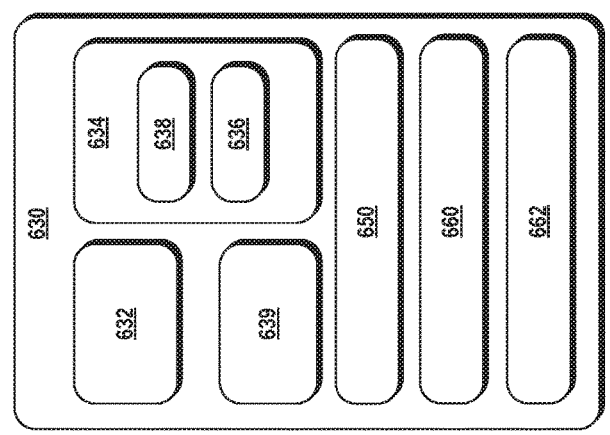
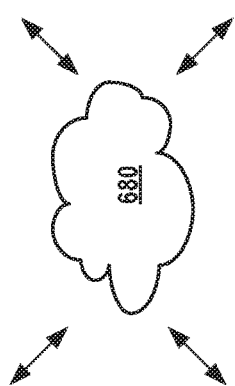
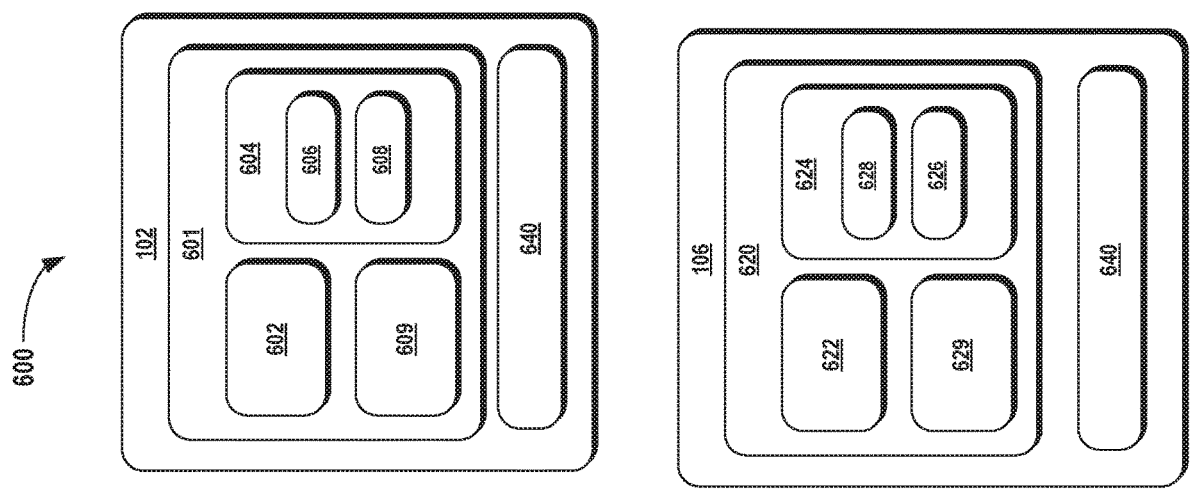
FIG. 6

OBJECT INTERACTION PREDICTION SYSTEMS AND METHODS FOR AUTONOMOUS VEHICLES

PRIORITY CLAIM

The present application is based on and claims priority to U.S. Provisional Application 62/589,951 having a filing date of Nov. 22, 2017, which is incorporated by reference herein.

FIELD

The present disclosure relates generally to improving the ability of an autonomous vehicle to determine future locations of objects within the vehicle's surrounding environment and controlling the autonomous vehicle regarding the same.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data associated with a first object and one or more second objects within a surrounding environment of an autonomous vehicle. The operations include determining an interaction between the first object and the one or more second objects based at least in part on the data associated with the first object and the one or more second objects. The operations include determining one or more predicted trajectories of the first object within the surrounding environment based at least in part on the interaction between the first object and the one or more second objects. The operations include outputting data indicative of the one or more predicted trajectories of the first object.

Another example aspect of the present disclosure is directed to an autonomous vehicle. The autonomous vehicle includes one or more processors and one or more tangible, non-transitory, computer readable media that collectively store instructions that when executed by the one or more processors cause a computing system to perform operations. The operations include obtaining state data indicative of one or more current or past states of a first object and one or more second objects within a surrounding environment. The operations include determining an initial predicted trajectory of the first object within the surrounding environment based at least in part on the state data indicative of the one or more current or past states of the first object. The operations include determining an interaction between the first object and the one or more second objects based at least in part on the initial predicted trajectory of the first object. The operations include determining one or more predicted trajectories of the first object within the surrounding environment based at least in part on the interaction between the first object and the one or more second objects.

Yet another example aspect of the present disclosure is directed to a computer-implemented method for determining object motion. The method includes obtaining, by a computing system including one or more computing devices, data indicative of an initial predicted trajectory of a first object within a surrounding environment of an autonomous vehicle. The method includes determining, by the computing system, an interaction between the first object and one or more second objects based at least in part on the initial predicted trajectory of the first object within the surrounding environment of the autonomous vehicle. The method includes determining, by the computing system, one or more predicted trajectories of the first object within the surrounding environment based at least in part on the interaction between the first object and the one or more second objects. The method includes outputting, by the computing system, data indicative of the one or more predicted trajectories of the first object.

Other example aspects of the present disclosure are directed to systems, methods, vehicles, apparatuses, tangible, non-transitory computer-readable media, and memory devices for predicting the locations of objects within a surrounding environment of an autonomous vehicle and controlling the autonomous vehicle with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIGS. 4A-D depict diagrams of example probabilities of predicted interaction trajectories according to example embodiments of the present disclosure;

FIG. 6 depicts example system components according to example embodiments of the present disclosure.

DETAILED DESCRIPTION

Figure 1:
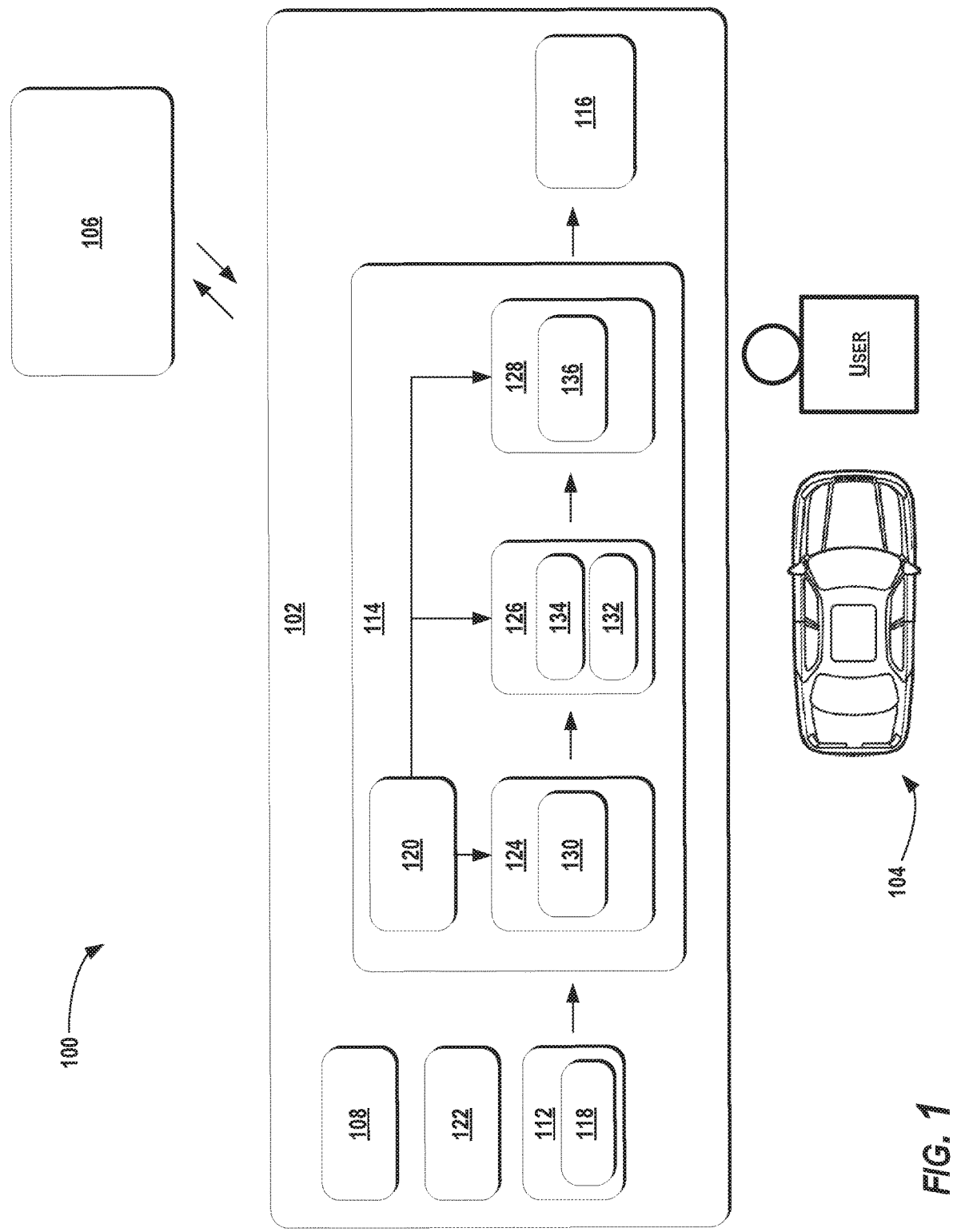
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure.

In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The present disclosure is directed to improved systems and methods for predicting the future locations of objects that are perceived by autonomous vehicles. In particular, an autonomous vehicle can predict the future location(s) of an object based on potential interactions that the object may experience within the vehicle's surrounding environment. For instance, the autonomous vehicle can predict an initial trajectory of each object (e.g., a pedestrian, vehicle, bicyclist, etc.) within the surrounding environment. The initial trajectory can represent a predicted path along which the respective object is initially predicted to travel and an associated timing. To help refine these predictions, the systems and methods of the present disclosure can enable an autonomous vehicle to determine whether an object may interact with other object(s), traffic rule(s), and/or the autonomous vehicle itself as well as the potential effects that such an interaction may have on the object's motion. By way of example, the autonomous vehicle can determine that a jaywalking pedestrian may interact with an oncoming vehicle based on the predicted initial trajectories of each object intersecting one another. Based on this interaction, the autonomous vehicle can predict one or more secondary interaction trajectories for the pedestrian. For example, the autonomous vehicle may predict that the jaywalking pedestrian may stop and wait for the oncoming vehicle to pass and/or that the jaywalking pedestrian may run ahead of the vehicle to cross the street. The autonomous vehicle can also determine a probability that the pedestrian may follow each of these interaction trajectories. The autonomous vehicle can consider both of these potential trajectories when planning the motion of the autonomous vehicle. In this way, the autonomous vehicle can more accurately predict the future location(s) of interacting objects within the vehicle's surrounding environment. The improved ability to predict future object location(s) can enable improved motion planning or other control of the autonomous vehicle, thereby enhancing passenger safety and vehicle efficiency.

More particularly, an autonomous vehicle can be a ground-based autonomous vehicle (e.g., car, truck, bus, etc.) or another type of vehicle (e.g., aerial vehicle) that can operate with minimal and/or no interaction from a human operator. The autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors (e.g., cameras, Light Detection and Ranging (LIDAR), Radio Detection and Ranging (RADAR), etc.), an autonomy computing system (e.g., for determining autonomous navigation), one or more vehicle control systems (e.g., for controlling braking, steering, powertrain, etc.), and/or other systems. The sensor(s) can gather sensor data (e.g., image data, RADAR data, LIDAR data, etc.) associated with the surrounding environment of the vehicle. For example, the sensor data can include LIDAR point cloud(s) and/or other data associated with one or more object(s) that are proximate to the autonomous vehicle (e.g., within a field of view of the sensor(s)) and/or one or more geographic features of the geographic area (e.g., curbs, lane markings, sidewalks, etc.). The object(s) can include, for example, other vehicles, pedestrians, bicycles, etc. The object(s) can be static objects (e.g., not in motion) or actor objects (e.g., dynamic objects in motion or that will be in motion). The sensor data can be indicative of characteristics (e.g., locations) associated with the object(s) at one or more times. The sensor(s) can provide such sensor data to the vehicle's autonomy computing system.

In addition to the sensor data, the autonomy computing system can obtain other types of data associated with the surrounding environment in which the objects (and/or the autonomous vehicle) are located. For example, the autonomy computing system can obtain map data that provides detailed information about the surrounding environment of the autonomous vehicle. The map data can provide information regarding: the identity and location of different roadways, road segments, buildings, sidewalks, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, laws/rules, or other traffic control devices); the location of obstructions (e.g., roadwork, accident, etc.); data indicative of events (e.g., scheduled concerts, parades, etc.); and/or any other map data that provides information that assists the vehicle computing system in comprehending and perceiving its surrounding environment and its relationship thereto.

The autonomy computing system can be a computing system that includes various sub-systems that cooperate to perceive the surrounding environment of the autonomous vehicle and determine a motion plan for controlling the motion of the autonomous vehicle. For example, the autonomy computing system can include a perception system, a prediction system, and a motion planning system.

The perception system can be configured to perceive one or more objects within the surrounding environment of the autonomous vehicle. For instance, the perception system can process the sensor data from the sensor(s) to detect the one or more objects that are proximate to the autonomous vehicle as well as state data associated therewith. The state data can be indicative of one or more states (e.g., current or past state(s)) of one or more objects that are within the surrounding environment of the autonomous vehicle. For example, the state data for each object can describe (e.g., at a given time, time period, etc.) an estimate of the object's current and/or past location (also referred to as position), current and/or past speed/velocity, current and/or past acceleration, current and/or past heading, current and/or past orientation, size/footprint, class (e.g., vehicle class vs. pedestrian class vs. bicycle class), the uncertainties associated therewith, and/or other state information.

The prediction system can be configured to predict the motion of the object(s) within the surrounding environment of the autonomous vehicle. For instance, the prediction system can create prediction data associated with the one or more the objects. The prediction data can be indicative of one or more predicted future locations of each respective object. The prediction data can indicate a predicted path associated with each object. The prediction system can determine a predicted trajectory along which the respective object is predicted to travel over time. The predicted trajectory can be indicative of the predicted path as well as the timing at which the object is predicted to traverse the path. This can be indicative of the intentions of the object. In some implementations, the prediction data can be indicative of the speed at which the object is predicted to travel along the predicted trajectory.

The prediction system can be configured to determine an initial predicted trajectory associated with an object within the surrounding environment of the autonomous vehicle. For instance, the prediction system can be a goal-oriented prediction system that, for each object perceived by the autonomous vehicle, generates one or more potential goals, selects one or more of the potential goals, and develops one or more initial predicted trajectories by which the object can achieve the one or more selected goals. By way of example, a pedestrian can be walking on a sidewalk adjacent to travel way (e.g., street, etc.) on which an autonomous vehicle is travelling. The pedestrian may be walking toward the travel way. The predication system can obtain state data indicative of one or more current or past states of the pedestrian as the pedestrian travels toward the travel way. The prediction system can determine that the pedestrian has a goal of crossing the travel way (e.g., in a jaywalking manner) based at least in part on such state data. Based on this goal, the prediction system can determine an initial trajectory for the pedestrian that predicts that the pedestrian will cross the travel way.

The initial predicted trajectory of an object can be affected by potential interactions between the object and other elements within the vehicle's environment. Thus, according to the present disclosure, the prediction system can include an interaction system that predicts such interactions and the possible effects of the interactions on the object's trajectory. To do so, the prediction system (e.g., the interaction system) can obtain data associated with an object within the surrounding environment of an autonomous vehicle. For instance, the prediction system can obtain data indicative of the initial predicted trajectory of the object within the surrounding environment (e.g., the goal-oriented based initial trajectory predication). In some implementations, the prediction system can obtain the map data indicative of one or more traffic rules and/or other geographic features (e.g., stop signs, stop lights, etc.). In some implementations, the prediction system obtain data (e.g., state data, predicted trajectories, etc.) associated with other objects within the environment and/or the planned motion trajectory of the autonomous vehicle.

The prediction system (e.g., the interaction system) can determine an interaction associated with the object. This can include various types of interactions. For instance, an interaction associated with an object can be a potential interaction between the object and another object within the surrounding environment. The other object can be an actor object that is moving (or is expected to move) within the surrounding environment (e.g., a moving vehicle) and/or a static object (e.g., a parked vehicle) that is stationary within the surrounding environment. In some implementations, the interaction can be based at least in part on a traffic rule. For example, the interaction can include a potential interaction between the object and a stop sign, merge area, stop light, etc. In some implementations, the interaction can include a potential interaction between the object and the autonomous vehicle (that is implementing the prediction system).

The prediction system (e.g., the interaction system) can predict an interaction associated with the object based at least in part on the data associated with the object obtained by the prediction system. For example, the prediction system can determine the interaction associated with the object based on the initial trajectory of the object, a trajectory and/or position of another object, a planned trajectory of the autonomous vehicle, map data, and/or other types of data. For instance, the prediction system can determine that an object may interact with another actor object in the event that initial trajectories for each of the respective objects would intersect and/or overlap at a similar time period. Additionally, or alternatively, the prediction system can determine that an object may interact with a static object in the event that the initial trajectory of the object would intersect with the location of the static object within the surrounding environment (e.g., the bounding box associated with the static object). Additionally, or alternatively, the prediction system can determine that an object may interact with the autonomous vehicle in the event that the initial trajectory of the object intersects with a planned motion trajectory of the autonomous vehicle (and/or a stopped position of the vehicle). In some implementations, the prediction system can determine the existence of an interaction based at least in part on the map data. For example, the prediction system can determine that an object may interact with a stop sign, merge area, traffic light, etc. based at least in part on the initial trajectory of the object and a map of the area in which the object is traveling. Moreover, the prediction system may determine that the object is likely to interact with another object and/or the autonomous vehicle based at least in part on the map data. By way of example, the prediction system can evaluate the initial trajectory and the map data of the area in which the object is traveling to determine that the object will be forced to merge left onto a one way street towards the trajectory of another object and/or the autonomous vehicle.

The prediction system (e.g., the interaction system) can determine one or more predicted interaction trajectories for the object based at least in part on the interaction. A predicted interaction trajectory can be indicative of a potential trajectory that the object may traverse as a result of the interaction. The prediction system can iteratively determine one or a plurality of predicted interaction trajectories of an object within the surrounding environment of the autonomous vehicle (e.g., resulting from a single interaction). For example, at each iteration, each trajectory can be adjusted to avoid conflict with other trajectories developed in the previous iteration.

In some implementations, the prediction system can determine the predicted interaction trajectories based at least in part on a rule(s)-based model. The rule(s)-based model can include an algorithm with heuristics that define the potential trajectories that an object may follow given the type of interaction and the surrounding circumstances. The heuristics can be developed based on driving log data acquired by autonomous vehicles in the real-world. Such driving log data can be indicative of real-world object-object interactions (e.g., including static and/or actor objects), object-autonomous vehicle interactions, object-traffic rule interactions, etc. Moreover, the driving log data can be indicative of the paths traveled by the objects in the real-world based on these interactions. For example, one or more rules can be indicative of the predicted interaction trajectories that a jaywalking pedestrian may follow based on an oncoming vehicle. This may include, for example, a predicted interaction trajectory indicating that the jaywalker will run across a travel way in front of the oncoming vehicle and/or another predicted interaction trajectory indicating that the jaywalker will stop to let the vehicle pass and then cross the travel way.

In some implementations, the vehicle computing system can determine the one or more predicted interaction trajectories based at least in part on a machine-learned model. For instance, the prediction system can include, employ, and/or otherwise leverage a machine-learned interaction prediction model. The machine-learned model interaction prediction model can be or can otherwise include one or more various model(s) such as, for example, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks. For instance, supervised training techniques can be performed to train the model to predict an interaction associated with the object and/or to the predicted interaction trajectories associated therewith (e.g., using labeled driving log data, sensor data, state data, etc. with known instances of interactions and/or the resultant trajectories). In some implementations, the training data can be based at least in part on the predicted interaction trajectories determined using the rule(s)-based model, as described herein, to help train a machine-learned model for interaction and/or trajectory prediction. The training data can be used to train the machine-learned model offline, which can then be used as an additional, or alternative, approach for predicting interactions and/or interaction trajectories (e.g., with less latency).

The vehicle computing system can input data into the machine-learned model and receive an output. For instance, the vehicle computing system (e.g., the prediction system) can obtain data indicative of the machine-learned model from an accessible memory onboard the autonomous vehicle and/or from a memory that is remote from the vehicle (e.g., via a wireless network). The vehicle computing system can input data into the machine-learned model. This can include the data associated with the object (e.g., initial trajectory, state data, sensor data, trajectory/state data of other objects, planned vehicle trajectories, map data, etc.) and/or other objects within the surrounding environment. The machine-learned model can process the data to predict an interaction associated with the object (e.g., an object-object interactions, etc.). Moreover, the machine-learned model can predict one or more interaction trajectories for the object based on the interaction. The machine-learned model can provide an output indicative of the interaction and/or the predicted interaction trajectories. In some implementations, the output can also be indicative of a probability associated with each respective trajectory, as further described herein.

In some implementations, the prediction system can determine one or more predicted interactions trajectories for an object based at least in part on one or more policies. A policy can be a special trajectory strategy applied to a set of predicted trajectories. For instance, a policy can indicate what an object may do given a scenario and/or type of interaction. By way of example, a policy may indicate that an object may yield and/or adhere to a right-of-way rule at an all-way stop. In another example, a policy may indicate that for a follow-lead scenario, the following object will queue behind the lead object (e.g., the following object will decelerate to match the speed of the lead object with a comfortable follow distance). Such policies can be implemented within the models (e.g., rule(s)-based, machine-learned, etc.) utilized to determine the predicted interaction trajectories.

In some implementations, policies can include one-time policies and/or repetitive policies. A one-time policy can be applied at the initial iteration (e.g., the 0th iteration) and subsequent trajectories developed in accordance with the policy will not be altered. For example, a policy may be used to help produce trajectories for vehicles in an all-way-stop.

A repetitive policy can be applied at each iteration. For example, at iteration K, the repetitive policy can be applied to develop trajectories using all trajectories from the last iteration and non-policy trajectories can be developed in the current iteration. In the event that the prediction system determines that a first object will follow a second object, the prediction system can utilize a policy to develop the trajectories of the two objects sequentially.

Additionally, or alternatively, the prediction system (e.g., the trajectory system) can generate a graph model (e.g., a directional graph) to represent the order in which interaction trajectories should be developed. For example, the interaction trajectories can be developed independently. At each iteration, the prediction system can create a graph with vertices that represent trajectories and edges that represent the dependency between two trajectories. For each trajectory, a model (e.g., a classifier) and/or a set of heuristics can be applied to mark a conflicting trajectory as a parent of the current trajectory if the conflicting trajectory should be developed first. An edge can be added to the graph to represent this dependency. The model heuristics can be used to determine a vehicle action (e.g., pass, queue, etc.) and other discrete decisions. The interaction system can search for cycles and bidirectional edges in the graph, develop trajectories in cycles and bidirectional edges jointly, and develop other trajectories sequentially. Such an approach can terminate when the graphs created by two iterations are the same.

The prediction system (e.g., the interaction system) can determine a probability for each of the respective one or more predicted interaction trajectories. A probability can be indicative of the likelihood that the object will act in accordance with that respective interaction trajectory. The probability can be expressed as a score, percentage, decimal, etc. For example, the interaction system can determine that there is a higher probability that a jaywalking pedestrian will stop and wait for an oncoming vehicle to pass than the jaywalking pedestrian running in front of the car. In some implementations, the probabilities for each of the trajectories can be provided to a trajectory scoring system that is configured to determine a final score for each of the predicted interaction trajectories. For example, the predication system can access and utilize a trajectory scoring model (e.g., a rule(s)-based model and/or a machine-learned model) that is trained or otherwise configured to receive a trajectory and an associated probability as input data. The trajectory scoring model can provide a final score indicative of, for example, how realistic or achievable such trajectory is for the object. Such a trajectory scoring model can be trained, for example, on training data that includes trajectories labelled as a valid trajectory (e.g., an observed trajectory) or an invalid trajectory (e.g., a synthesized trajectory). The prediction system can output data indicative of the one or more predicted interaction trajectories to the motion planning system (e.g., as prediction data) of the autonomous vehicle. The output can be indicative of all the predicted trajectories as well as the final score associated with each respective trajectory.

The motion planning system can determine a motion plan for the autonomous vehicle based at least in part on the one or more predicted interaction trajectories. A motion plan can include vehicle actions (e.g., planned vehicle trajectories, speed(s), acceleration(s), other actions, etc.) with respect to the objects proximate to the vehicle as well as the objects' predicted movements. For instance, the motion planning system can implement an optimization algorithm that considers cost data associated with a vehicle action as well as other objective functions (e.g., cost functions based on speed limits, traffic lights, etc.), if any, to determine optimized variables that make up the motion plan. The motion planning system can determine that the vehicle can perform a certain action (e.g., pass an object) without increasing the potential risk to the vehicle and/or violating any traffic laws (e.g., speed limits, lane boundaries, signage). For instance, the motion planning system can evaluate each of the predicted interaction trajectories (and associated score(s)) during its cost data analysis as it determines an optimized vehicle trajectory through the surrounding environment. In some implementations, one or more of the predicted interaction trajectories may not ultimately change the motion of the autonomous vehicle. In some implementations, the motion plan may define the vehicle's motion such that the autonomous vehicle avoids the object(s) that are predicted to interact within the surrounding environment, reduces speed to give more leeway around certain object(s), proceeds cautiously, performs a stopping action, etc.

The autonomous vehicle can initiate travel in accordance with at least a portion of motion plan. For instance, the motion plan can be provided to the vehicle control systems, which can include a vehicle controller that is configured to implement the motion plan. The vehicle controller can, for example, translate the motion plan into instructions for the vehicle control system (e.g., acceleration control, brake control, steering control, etc.). This can allow the autonomous vehicle to autonomously travel while taking into account the object interactions within the vehicle's surrounding environment.

The systems and methods described herein provide a number of technical effects and benefits. For instance, the present disclosure provides systems and methods for improved predictions of object trajectories within the surrounding environment of the autonomous vehicles and improved vehicle control. The improved ability to detect interactions (e.g., object-object interactions, object-traffic rule interactions, object-autonomous vehicle interactions, etc.) can enable improved motion planning and/or other control of the autonomous vehicle based on such interactions, thereby further enhancing passenger safety and vehicle efficiency. Thus, the present disclosure improves the operation of an autonomous vehicle computing system and the autonomous vehicle it controls. In addition, the present disclosure provides a particular solution to the problem of predicting object interactions and the resultant trajectories and provides a particular way (e.g., use of specific rules, machine-learned models, etc.) to achieve the desired outcome. The present disclosure also provides additional technical effects and benefits, including, for example, enhancing passenger/vehicle safety and improving vehicle efficiency by reducing collisions (e.g., potentially caused by object interactions)

The systems and methods of the present disclosure also provide an improvement to vehicle computing technology, such as autonomous vehicle computing technology. For instance, the systems and methods enable the vehicle technology to determine whether an object may experience an interaction and the potential motion trajectories that such an object may follow as a result. In particular, a computing system (e.g., a vehicle computing system) can obtain data associated with a first object and one or more second objects within the surrounding environment of an autonomous vehicle (e.g., initial trajectory data, map data, etc.). The computing system can determine an interaction between the first object and the one or more second objects based at least in part on such data. The computing system can determine one or more predicted interaction trajectories of the first object within the surrounding environment based at least in part on the interaction between the first object and the one or more second objects. The computing system can output data indicative of the one or more predicted interaction trajectories of the first object (e.g., to the motion planning system, local memory, etc.). By identifying potential trajectories of an object based on predicted interactions, the computing system can plan vehicle motion based on the informed knowledge that predicted object motion trajectories may be affected by interactions within the surrounding environment. This may be used to alter autonomous vehicle behavior near these objects such as, for example, to be more conservative to avoid any interference with the objects. Accordingly, the systems and methods of the present disclosure improve the ability of a vehicle computing system to predict the motion of objects within its surrounding environment, while also improving the ability to control the autonomous vehicle With reference now to the FIGS., example embodiments of the present disclosure will be discussed in further detail. FIG. 1 illustrates an example system 100 according to example embodiments of the present disclosure. The system 100 can include a vehicle computing system 102 associated with a vehicle 104. In some implementations, the system 100 can include an operations computing system 106 that is remote from the vehicle 104.

In some implementations, the vehicle 104 can be associated with an entity (e.g., a service provider, owner, manager). The entity can be one that offers one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104 (and/or a user device). The computing device(s) of the operations computing system 106 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 106 (e.g., the one or more processors, etc.) to perform operations and functions, such as providing data to and/or receiving data from the vehicle 104, for managing a fleet of vehicles (that includes the vehicle 104), etc.

The vehicle 104 incorporating the vehicle computing system 102 can be a ground-based autonomous vehicle (e.g., car, truck, bus, etc.), an air-based autonomous vehicle (e.g., airplane, helicopter, or other aircraft), or other types of vehicles (e.g., watercraft, etc.). The vehicle 104 can be an autonomous vehicle that can drive, navigate, operate, etc. with minimal and/or no interaction from a human operator (e.g., driver). In some implementations, a human operator can be omitted from the vehicle 104 (and/or also omitted from remote control of the vehicle 104). In some implementations, a human operator can be included in the vehicle 104.

In some implementations, the vehicle 104 can be configured to operate in a plurality of operating modes. The vehicle 104 can be configured to operate in a fully autonomous (e.g., self-driving) operating mode in which the vehicle 104 is controllable without user input (e.g., can drive and navigate with no input from a human operator present in the vehicle 104 and/or remote from the vehicle 104). The vehicle 104 can operate in a semi-autonomous operating mode in which the vehicle 104 can operate with some input from a human operator present in the vehicle 104 (and/or remote from the vehicle 104). The vehicle 104 can enter into a manual operating mode in which the vehicle 104 is fully controllable by a human operator (e.g., human driver, pilot, etc.) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode to help assist the human operator of the vehicle 104.

The operating modes of the vehicle 104 can be stored in a memory onboard the vehicle 104. For example, the operating anodes can be defined by an operating mode data structure (e.g., rule, list, table, etc.) that indicates one or more operating parameters for the vehicle 104, while in the particular operating mode. For example, an operating mode data structure can indicate that the vehicle 104 is to autonomously plan its motion when in the fully autonomous operating mode. The vehicle computing system 102 can access the memory when implementing an operating mode.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send data to the vehicle 104 instructing the vehicle 104 to enter into, exit from, maintain, etc. an operating mode. By way of example, the operations computing system 106 can send data to the vehicle 104 instructing the vehicle 104 to enter into the fully autonomous operating mode. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 104 (e.g., its computing system, one or more processors, etc.) to perform operations and functions, such as those described herein for autonomously navigating the vehicle 104 through a surrounding environment, determining object motion, control vehicle motion, etc.

The vehicle 104 can include a communications system 108 configured to allow the vehicle computing system 102 (and its computing device(s)) to communicate with other computing devices. The vehicle computing system 102 can use the communications system 108 to communicate with the operations computing system 106 and/or one or more other computing device(s) over one or more networks (e.g., via one or more wireless signal connections). In some implementations, the communications system 108 can allow communication among one or more of the system(s) onboard the vehicle 104. The communications system 108 can include any suitable components for interfacing with one or more network(s), including, for example, transmitters, receivers, ports, controllers, antennas, and/or other suitable components that can help facilitate communication.

As shown in FIG. 1, the vehicle 104 can include one or more vehicle sensors 112, an autonomy computing system 114, one or more vehicle control systems 116, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 112 can be configured to acquire sensor data 118 associated with one or more objects that are within the surrounding environment of the vehicle 104 (e.g., within a field of view of one or more of the vehicle sensor(s) 112). The vehicle sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the vehicle sensor(s) 112. The object(s) can include, for example, pedestrians, vehicles, bicycles, and/or other objects. The object(s) can be located in front of, to the rear of, to the side of the vehicle 104, etc. The sensor data 118 can be indicative of locations associated with the object(s) within the surrounding environment of the vehicle 104 at one or more times. The vehicle sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 104 in comprehending and perceiving its surrounding environment and its relationship thereto. In some implementations, the vehicle computing system 102 can determine a vehicle route for the vehicle 104 based at least in part on the map data 120.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the vehicle sensor data 118 (e. LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the vehicle sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The vehicle computing system 102 (e.g., the autonomy system 114) can identify one or more objects that are proximate to the vehicle 104 based at least in part on the sensor data 118 and/or the map data 120. For example, the vehicle computing system 102 (e.g., the perception system 124) can process the sensor data 118, the map data 120, etc. to obtain state data 130. The vehicle computing system 102 can obtain state data 130 that is indicative of one or more states (e.g., current and/or past state(s)) of one or more objects that are within a surrounding environment of the vehicle 104. For example, the state data 130 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 124 can provide the state data 130 to the prediction system 126.

The prediction system 126 can be configured to predict a motion of the object(s) within the surrounding environment of the vehicle 104. For instance, the prediction system 126 can create prediction data 132 associated with such object(s). The prediction data 132 can be indicative of one or more predicted future locations of each respective object. The prediction data 132 can indicate a predicted path associated with each object, if any. The prediction system 126 can determine a predicted trajectory along which the respective object is predicted to travel over time. The predicted trajectory can be indicative of the predicted path as well as the timing at Which the object is predicted to traverse the path. This can be indicative of the intentions of the object. In some implementations, the prediction data can be indicative of the speed at which the object is predicted to travel along the predicted trajectory.

The prediction system 126 can be configured to determine an initial predicted trajectory associated with an object within the surrounding environment of the vehicle 104. For instance, the prediction system 126 can be a goal-oriented prediction system that, for each object perceived by the vehicle 104 (e.g., the perception system 124), generates one or more potential goals, selects one or more of the potential goals, and develops one or more initial predicted trajectories by which the object can achieve the one or more selected goals.

Figure 2:
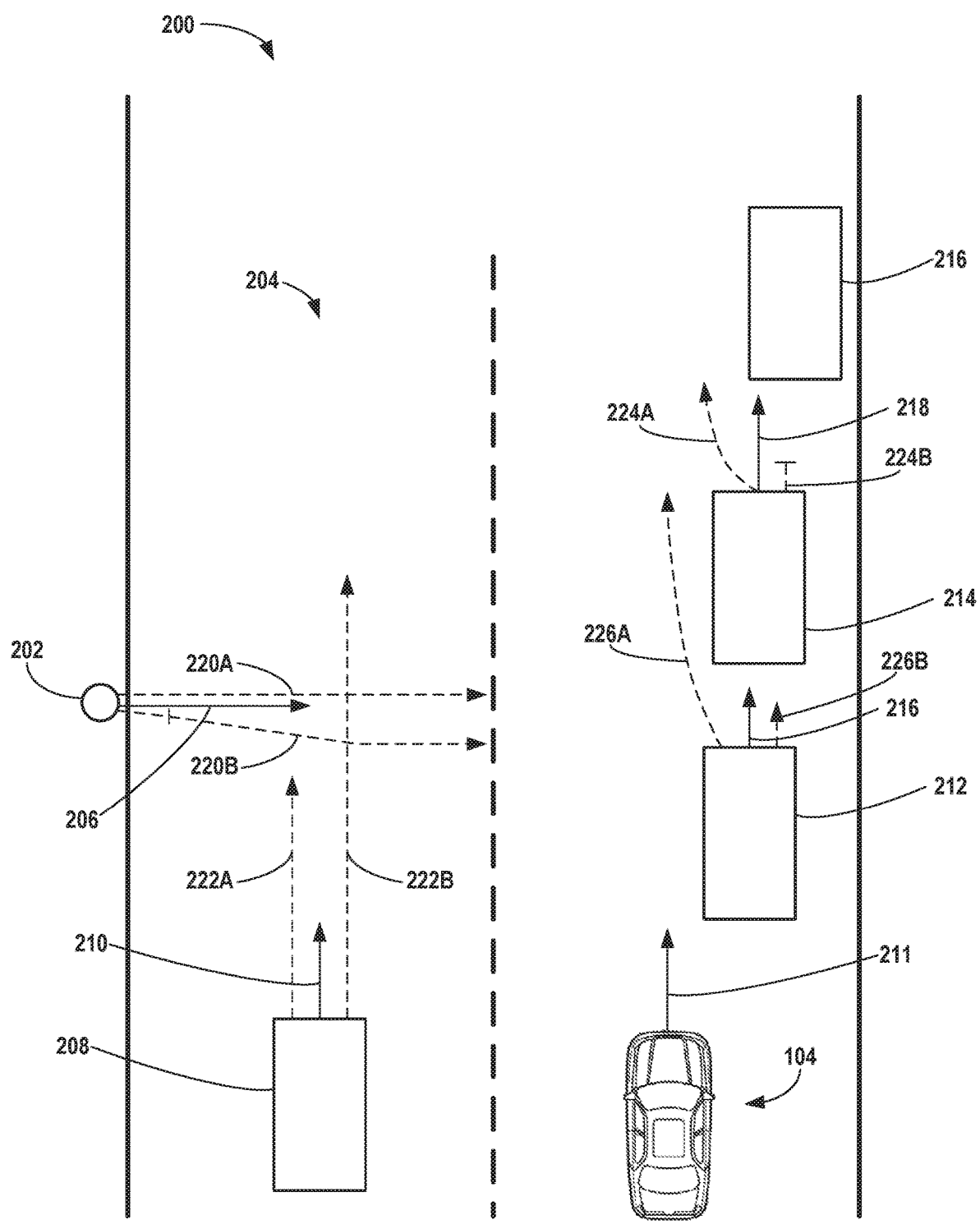
FIG. 2 depicts an example environment of an autonomous vehicle according to example embodiments of the present disclosure.

By way of example, FIG. 2 depicts an example geographic area 200 in which a vehicle 104 is travelling according to example embodiments of the present disclosure. A first object 202 (e.g., a pedestrian) can be travelling on a sidewalk adjacent to travel way 204 (e.g., street, etc.) on which a vehicle 104 is travelling. The first object 202 may be traveling toward the travel way 204. The vehicle computing system 102 can obtain state data 130 indicative of one or more current or past states of the first object 202 within the surrounding environment (e.g., as the first object 202 travels toward the travel way 204). The vehicle computing system 102 can determine that the first object 202 has a goal of crossing the travel way 204 (e.g., in a jaywalking manner) based on such state data. The vehicle computing system 102 can determine the initial predicted trajectory 206 of the first object 202 based at least in part on the state data 130 indicative of the one or more current or past states of the first object 202 within the surrounding environment. For instance, the vehicle computing system 102 can determine an initial trajectory 206 for the first object 202 that predicts that the first object 202 will cross the travel way 204. In some implementations, the one or more the one or more second objects can include a static object within the surrounding environment. The one or more second objects can include an actor object within the surrounding environment. The one or more second objects can include the vehicle 104.

Returning to FIG. 1, the vehicle computing system 102 (e.g., the prediction system 126) can include an interaction system 134 that predicts potential interactions between an object and other objects and/or elements within the vehicle's environment. The interaction system 134 can be configured to determine the potential effect(s) of such interaction(s) on an object's trajectory. To do so, the vehicle computing system 102 can obtain data associated with a first object and one or more second objects within a surrounding environment of the vehicle 104. By way of example, with reference to FIG. 2, the data associated with the first object and the one or more second objects within the surrounding environment can include data indicative of an initial predicted trajectory 206 of the first object 202 within the surrounding environment (e.g., the goal-oriented based initial trajectory predication). Additionally, or alternatively, the vehicle computing system 102 can obtain state data 130 associated with the first object 202. Additionally, or alternatively, the vehicle computing system 102 can obtain map data 120 indicative of one or more traffic rules and/or other geographic features (e.g., stop signs, stop lights, etc.). The vehicle computing system 102 can obtain data (e.g., state data, predicted trajectories, etc.) associated with the one or more second objects, such as object 208. For instance, the vehicle computing system 102 can obtain data indicative of an initial predicted trajectory 210 of the object 208. Additionally, or alternatively, the vehicle computing system 102 can obtain data indicative of a planned motion trajectory 211 of the vehicle 104.

The vehicle computing system 102 (e.g., the interaction system 134) can determine an interaction associated with the first object 202. This can include various types of interactions. For instance, this can include a potential interaction between the first object 202 and a second object within the surrounding environment (e.g., the object 208, the vehicle 104, etc.). In some implementations, the interaction can be associated with a traffic rule. For example, the interaction can include a potential interaction between the first object 202 and a stop sign, merge area, stop light, etc. In some implementations, an interaction can be unidirectional (e.g., reactions to traffic rules, parked vehicles, lead-follow vehicle scenario, etc.), in that the motion of only one object is affected. In some implementations, an interaction can be bi-directional in that multiple interacting objects are affected.

The vehicle computing system can determine an interaction between two objects based on the obtained data associated with the objects. In some implementations, the vehicle computing system 102 (e.g., the interaction system 134) can predict an interaction associated with an object based at least in part on the data associated with that object. In some implementations, the vehicle computing system 102 can determine an interaction between determining an interaction between the first object 202 and the one or more second objects (e.g., object 208) based at least in part on the data associated with the first object 202 and the one or more second objects.

For example, the vehicle computing system 102 can determine the interaction associated with the first object 202 based the initial predicted trajectory 206 of the first object 202 and an initial predicted trajectory 210 and/or position of another, second object 208, map data 120, and/or other types of data. For instance, the vehicle computing system 102 can determine the interaction between the first object 202 and one or more second objects based at least in part on the initial trajectory of the first object 202. By way of example, the vehicle computing system can predict that the first object 202 may interact with another second object 208 in the event that initial trajectories 206, 210 for each of the respective objects would intersect and/or overlap at a similar time period. In another example, the vehicle computing system 102 can predict an interaction between an object 212 (e.g., a follow vehicle) and another object 214 (e.g., a lead vehicle) based at least in part on the initial trajectory 216 of the object 212, a speed of the object 212, the position of the object 212 (e.g., the travel lane in which the object is travelling), and/or other features of the object 212 and the initial trajectory 218 and/or position of the object 214. Additionally, or alternatively, the vehicle computing system 102 can determine that an object 214 may interact with a static object 216 (e.g., a parked vehicle, a parked bicycle, etc.) in the event that the initial trajectory 218 of the object 214 would intersect with the location of the static object 216 within the surrounding environment (e.g., the bounding box associated with the static object). In another example, an interaction between an object and the vehicle 104 can be determined based at least in part on the initial trajectory of the object and a planned motion trajectory 211 and/or position of the vehicle 104.

In some implementations, the interaction between a first object and one or more second objects can be determined based at least in part on map data 120 associated with the surrounding environment of the vehicle 104. For example, the vehicle computing system 102 can determine that an object may interact with a stop sign, merge area, traffic light, etc. based at least in part on the initial trajectory of the object and a map of the area in which the object is traveling. Moreover, the vehicle computing system 102 may determine that the object is likely to interact with another object and/or the vehicle 102 based at least in part on the map data. By way of example, the vehicle computing system 102 can evaluate the initial trajectory 216 and the map data 120 of the area in which an object 212 is traveling to determine that the object 212 is travelling within the same travel lane as another object 214 and will approach the other object 214.

The vehicle computing system 102 (e.g., the interaction system 134) can determine one or more predicted interaction trajectories for the object based at least in part on the interaction. A predicted interaction trajectory can be indicative of a potential trajectory that the object may traverse as a result of the interaction. For instance, the vehicle computing system 102 can determine one or more predicted interaction trajectories 220A-B of the first object 202 within the surrounding environment based at least in part on the interaction between the first object 202 and the one or more second objects (e.g., the object 208). Additionally, or alternatively, the vehicle computing system 102 can determine one or more predicted interaction trajectories 222A-B of the one or more second objects (e.g., object 208) based at least in part on the interaction associated with the respective second object (e.g., the interaction between the first object 202 and the object 208). In another example, the vehicle computing system 102 can determine one or more predicted interaction trajectories 224A-B for the object 214 based at least in part on the interaction between the object 214 and the static object 216 (e.g., a parked vehicle). The vehicle computing system 102 can determine one or more predicted interaction trajectories 226A-B for the object 212 based on the interaction of the object 212 (e.g., the follow vehicle) with the object 214 (e.g., the lead vehicle). In some implementations, the predicted interaction trajectories can be indicative of a discrete decision associated with a vehicle action (e.g., pass, queue, stop. etc.

The vehicle computing system 102 can iteratively determine one or a plurality of predicted interaction trajectories of an object within the surrounding environment of the vehicle 104 (e.g., resulting from a single interaction). For example, at each iteration, each trajectory can be adjusted to avoid conflict with other trajectories developed in the previous iteration. The vehicle computing system 102 can predict an interaction between objects based on a potential conflict between the respective trajectories of those objects. For instance, the vehicle computing system 102 can determine that a first predicted interaction trajectory of the first object 202 is in conflict with one or more second predicted interaction trajectories of the one or more second objects (e.g., object 208). Trajectories can be considered to be in conflict, for example, in the event that those trajectories would lead to a collision of the objects. In response to determining that the first predicted interaction trajectory of the first object 202A is in conflict with the one or more second predicted interaction trajectories of the one or more second objects (e.g., object 208), the vehicle computing system 102 can determine the one or more predicted interaction trajectories 220A-B of the first object 202 such that the one or more predicted interaction trajectories 220A-B of the first object are not in conflict with the one or more second predicted interaction trajectories 222A-B of the one or more second objects. For example, the vehicle computing system 102 can select the trajectories for a first object 202 that are not in conflict with the predicted interaction trajectories of the one or more second objects (e.g., would not cause the first object 202 to collide with the second object(s)) as the predicted interaction trajectories 220A-B of the first object 202 that may occur as a result of the interaction.

In some implementations, the vehicle computing system 102 can determine one or more predicted interactions trajectories for an object based at least in part on one or more policies. A policy can be a special trajectory strategy applied to a set of predicted trajectories. For instance, a policy can indicate what an object may do given a scenario and/or type of interaction. By way of example, a policy may indicate that an object may yield and/or adhere to a right-of-way rule at an all-way stop. In another example, a policy may indicate that for a follow-lead scenario, the following object will queue behind the lead object (e.g., the following object will decelerate to match the speed of the lead object with a comfortable follow distance). Such policies can be implemented within the models (e.g., rule(s)-based, machine-learned, etc.) utilized to determine the predicted interaction trajectories. For example, the vehicle computing system 102 can determine that the object 212 will decelerate to match the speed of the object 214 based on a follow-lead policy.

In some implementations, policies can include one-time policies and/or repetitive policies. A one-time policy can be applied at the initial iteration (e.g., the 0th iteration) and subsequent trajectories developed in accordance with the policy will not be altered. For example, a policy may be used to help produce trajectories for vehicles in an all-way-stop. A repetitive policy can be applied at each iteration. For example, at iteration K, the repetitive policy can be applied to develop trajectories using all trajectories from the last iteration and non-policy trajectories can be developed in the current iteration. In the event that the vehicle computing system 102 determines that the object 212 will follow another object 214, the vehicle computing system 102 can utilize a policy to determine the trajectories of the two objects 212, 214 sequentially.

Additionally, or alternatively, the vehicle computing system 102 (e.g., the trajectory system 134) can determine the predicted trajectories of an object based on a graph model. For instance, the vehicle computing system 102 can determine an interaction for a first object 202 and one or more second objects (e.g., object 208) by associating the first object 202 with the one or more second objects using a graph model. After associating the first object 202 with the one or more second objects (e.g., object 208), the vehicle computing system 102 can determine the one or more predicted interaction trajectories of the first object 202 based on the graph model. By way of example, the vehicle computing system 102 can generate a directional graph. The directional graph can represent the order in which interaction trajectories should be developed. For example, the interaction trajectories can be developed independently. At each iteration, the vehicle computing system 102 can create a graph with vertices that represent trajectories and edges that represent the dependency between two trajectories. For each trajectory, a model (e.g., a classifier) and/or a set of heuristics can be applied to mark a conflicting trajectory as a parent of the current trajectory if the conflicting trajectory should be developed first. An edge can be added to the graph to represent this dependency. The model/heuristics can be used to determine a vehicle action (e.g., pass, queue, etc.) and other discrete decisions. The vehicle computing system 102. (e.g., the interaction system 134) can search for cycles and bidirectional edges in the graph, develop trajectories in cycles and bidirectional edges jointly, and develop other trajectories sequentially. Such an approach can terminate when the graphs created by two iterations are the same.

In some implementations, the vehicle computing system 102 can determine an interaction and/or predicted interaction trajectories based at least in part on sensor data. For example, the vehicle computing system 102 can obtain image data (e.g., rasterized image data) associated with the surrounding environment. The image data can be indicative of geographic features (e.g., stop lines, lane boundaries. etc.). The vehicle computing system 102 (e.g., the interaction system 134) can determine the interaction based at least in part on the image data. For instance, the vehicle computing system 102 can determine that an object will interact with a stop sign and/or merge into a lane based on such image data.

In some implementations, the vehicle computing system 102 can determine predicted interaction trajectories based at least in part on a rule(s)-based model. The rule(s)-based model can include an algorithm with heuristics that define the potential trajectories that an object may follow given the type of interaction and the surrounding circumstances. The heuristics can be developed based on driving log data acquired by vehicle(s) (e.g., autonomous vehicles) in the real-world. Such driving log data can be indicative of real-world object-object interactions (e.g., including static and/or actor objects), object-vehicle interactions, object-traffic rule interactions, etc. Moreover, the driving log data can be indicative of the paths traveled by the objects in the real-world based on these interactions. For example, one or more rules can be indicative of the predicted interaction trajectories that a jaywalking pedestrian may follow based on an oncoming vehicle. This may include, for example, a predicted interaction trajectory indicating that the jaywalker will run across a travel way in front of the oncoming vehicle and/or another predicted interaction trajectory indicating that the jaywalker will stop to let the oncoming vehicle pass and then cross the travel way.

Figure 3:
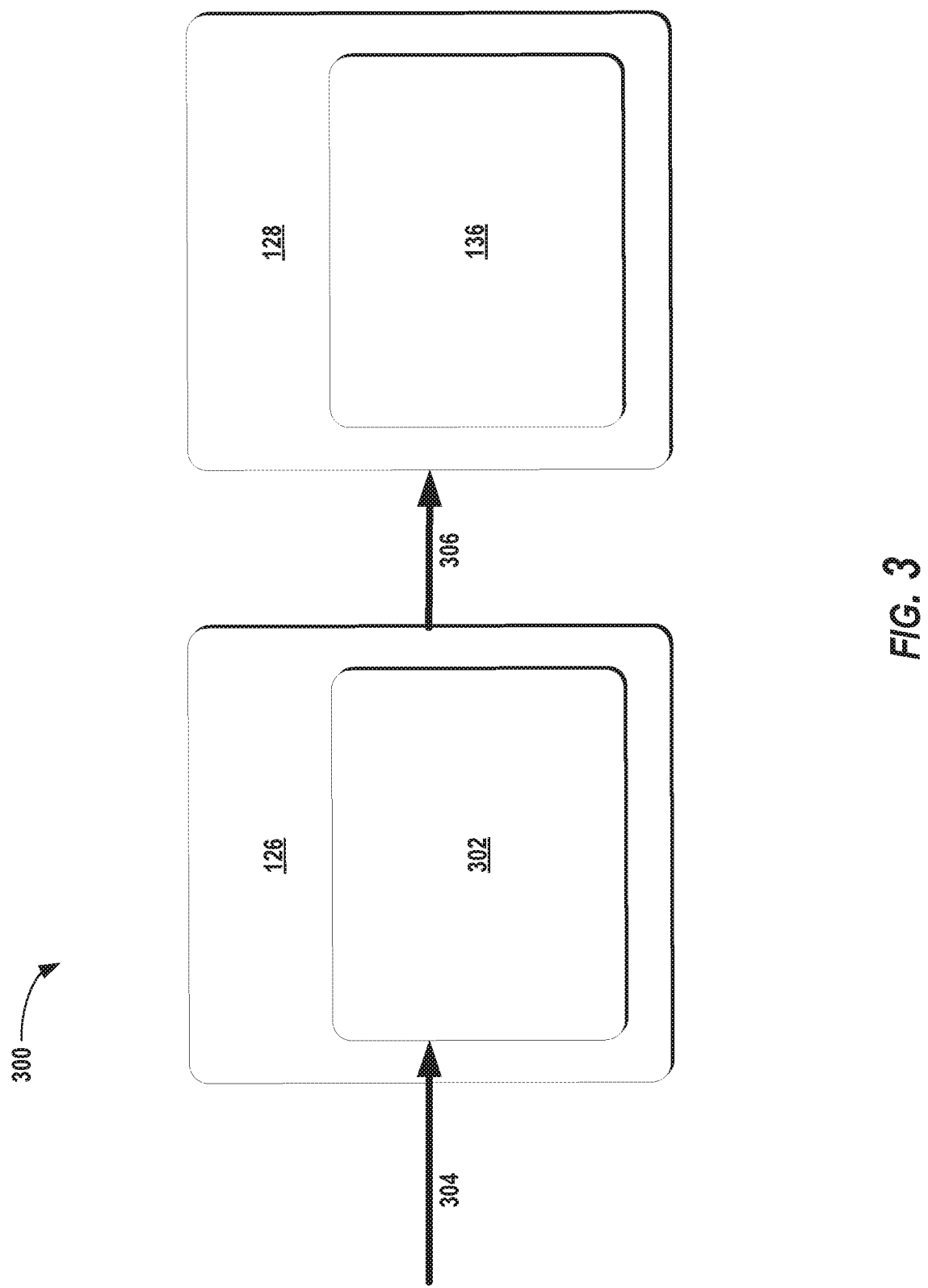
FIG. 3 depicts a diagram of an example implementation of a model according to example embodiments of the present disclosure.

In some implementations, the vehicle computing system 102 (a g., the interaction system 134) can determine one or more predicted interaction trajectories based at least in part on a machine-learned model. FIG. 3 depicts an example a diagram 300 of an example implementation of a model 302 according to example embodiments of the present disclosure. For instance, the vehicle computing system 102 can include, employ, and/or otherwise leverage a machine-learned interaction prediction model 302. The machine-learned interaction prediction model 302 can be or can otherwise include one or more various model(s) such as, for example, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks. For instance, supervised training techniques can be performed to train the machine-learned interaction prediction model 302 to predict an interaction between a first object and one or more second objects and/or to the predicted interaction trajectories associated therewith (e.g., using labeled driving log data, sensor data, state data, etc. with known instances of interactions and/or the resultant trajectories). In some implementations, the training data can be based at least in part on the predicted interaction trajectories determined using the rules-based model, as described herein, to help train the machine-learned interaction prediction model 302 to predict one or more interactions and/or interaction trajectories. The training data can be used to train the machine-learned model offline, which can then be used as an additional, or alternative, approach for predicting interactions and/or interaction trajectories.

The vehicle computing system 102 can input data into the machine-learned model and receive an output. For instance, the vehicle computing system 102 can obtain data indicative of the machine-learned interaction prediction model 302 from an accessible memory onboard the vehicle 104 and/or from a memory that is remote from the vehicle 104 (e.g., via a wireless network). The vehicle computing system 102 can provide input data 304 into the machine-learned interaction prediction model 302. The input data 304 can include the data associated with the first object and the one or more second objects. This can include the data indicative of the initial trajectory, state data, sensor data, trajectory/state data of other objects, planned vehicle trajectories, map data, etc. associated with the first object and/or data indicative the initial trajectory, state data, sensor data, trajectory/state data of other objects, planned vehicle trajectories, map data, etc. associated with the one or more second objects. The machine-learned interaction prediction model 302 can process the input data 304 to predict an interaction associated with an object (e.g., an object-object interaction, an object-vehicle interaction, etc.). Moreover, the machine-learned interaction prediction model 302 can predict one or more interaction trajectories for an object based at least in part on the interaction. The vehicle computing system 102 can obtain an output 306 from the machine-learned interaction prediction model 302. The output 304 can be indicative of the one or more predicted interaction trajectories of an object within the surrounding environment. For example, the output 304 can be indicative of the one or more predicted interaction trajectories 220A-B of the first object 202 within the surrounding environment. In some implementations, the vehicle computing system 102 can provide input data indicative of the predicted interaction and the machine-learned interaction prediction model 302 can output the predicted interaction trajectories based on such input data. In some implementations, the output 304 can also be indicative of a probability associated with each respective trajectory.

FIGS. 4A-D depict diagrams of example probabilities of predicted interaction trajectories according to example embodiments of the present disclosure. The vehicle computing system 102 (e.g., the interaction system 134) can determine a probability for each of the respective one or more predicted interaction trajectories. A probability can be indicative of the likelihood of the object (e.g., the first object 202) acting in accordance with that respective predicted interaction trajectory. The probability can be expressed as a score, percentage, decimal, and/or other format.

With reference to FIG. 4A, the vehicle computing system 102 can determine that there is a higher probability (e.g., PROBABILITY 1) that the first object 202 (e.g., a jaywalking pedestrian) will act in accordance with the predicted interaction trajectory 220B, for example, by stopping and waiting for the object 208 (e.g., an oncoming vehicle) to pass before crossing the travel way 204 than the probability (e.g., PROBABILITY 2) that first object 202 will act in accordance with predicted interaction trajectory 220A (e.g., running in front of the oncoming vehicle before it passes). In another example, with reference to FIG. 4B, the vehicle computing system 102 can determine a probability (e.g., PROBABILITY 3) that the object 208 will act in accordance with predicted interaction trajectory 222A (e.g., queue behind a pedestrian, reduce speed, etc.) and/or a probability (e.g., PROBABILITY 4) that the object 208 will act in accordance with the predicted interaction trajectory 222B (e.g., pass the pedestrian, etc.). In another example, with reference to FIG. 4C, the vehicle computing system 102 can determine a probability (e.g., PROBABILITY 5) that the object 214 will act in accordance with predicted interaction trajectory 224A (e.g., nudge around a parked vehicle, etc.) and/or a probability (e.g., PROBABILITY 6) that the object 214 will act in accordance with the predicted interaction trajectory 224B (e.g., stop behind the parked vehicle, etc.). In another example, with reference to FIG. 4D, the vehicle computing system 102 can determine a probability (e.g., PROBABILITY 7) that the object 212 will act in accordance with predicted interaction trajectory 226A (e.g., pass a lead vehicle, etc.) and/or a probability (e.g., PROBABILITY 8) that the object 212 will act in accordance with predicted interaction trajectory 226B (e.g., queue behind a lead vehicle, etc.)

In some implementations, the probabilities for each of the trajectories can be provided to a trajectory scoring system that is configured to determine a final score for each of the predicted interaction trajectories. For example, the vehicle computing system 102 (e.g., the prediction system 126) can access and utilize a trajectory scoring model (e.g., a rule(s)-based model and/or a machine-learned model) that is trained or otherwise configured to receive a trajectory and an associated probability as input data. The trajectory scoring model can provide a final score indicative of, for example, how realistic or achievable such trajectory is for the object. Such a trajectory scoring model can be trained, for example, on training data that includes trajectories labelled as a valid trajectory (e.g., an observed trajectory) or an invalid trajectory (e.g., a synthesized trajectory).

Returning to FIG. 1, the vehicle computing system 102 can output data indicative of the one or more predicted interaction trajectories (e.g., of the first object 202). For example, such data can be indicative of the predicted interaction trajectories 220A-B of the first object 202 as well as the final score associated with each respective trajectory. The prediction system 126 can output this data to the motion planning system 128 (e.g., as shown in FIG. 3). The vehicle computing system 102 (e.g., the motion planning system 128) can determine a motion plan 136 for the vehicle 104 based at least in part on the one or more predicted interaction trajectories 220A-B of the first object 202 within the surrounding environment. A motion plan 136 can include vehicle actions (e.g., planned vehicle trajectories, speed(s), acceleration(s), other actions, etc.) with respect to the objects proximate to the vehicle as well as the objects' predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 136. The motion planning system 128 can determine that the vehicle 104 can perform a certain action (e.g., pass an object) without increasing the potential risk to the vehicle and/or violating any traffic laws (e.g., speed limits, lane boundaries, signage). For instance, the motion planning system 128 can evaluate each of the predicted interaction trajectories 220A-B (and associated score(s)) during its cost data analysis as it determines an optimized vehicle trajectory through the surrounding environment. In some implementations, one or more of the predicted interaction trajectories 220A-B may not ultimately change the motion of the vehicle 104 (e.g., because another variable is deemed more critical). In some implementations, the motion plan 136 may define the vehicle's motion such that the vehicle 104 avoids the object(s) that are predicted to interact within the surrounding environment, reduces speed to give more leeway around certain object(s), proceeds cautiously, performs a stopping action, etc.

The motion planning system 128 can be configured to continuously update the vehicle's motion plan 136 and a corresponding planned vehicle motion trajectory. For example, in some implementations, the motion planning system 128 can generate new motion plan(s) 136 for the vehicle 104 (e.g., multiple times per second). Each new motion plan can describe motion of the vehicle 104 over the next several seconds (e.g., 5 seconds). Moreover, a new motion plan may include a new planned vehicle motion trajectory. Thus, in some implementations, the motion planning system 128 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 104.

The vehicle computing system 102 can cause the vehicle 104 to initiate a motion in accordance with at least a portion of the motion plan 136. For instance, the motion plan 136 can be provided to the vehicle control systems 116, which can include a vehicle controller that is configured to implement the motion plan 136. The vehicle controller can, for example, translate the motion plan 136 into instructions for the vehicle controls(e.g., acceleration control, brake control, steering control, etc.). By way of example, the vehicle controller can translate a determined motion plan 136 into instructions to adjust the steering of the vehicle 104 "X" degrees, apply a certain magnitude of braking force, etc. The vehicle controller can send one or more control signals to the responsible vehicle control (e.g., braking control system, steering control system, acceleration control system, etc.) to execute the instructions and implement the motion plan 136. This can allow the vehicle control system(s) 116 to control the motion of the vehicle 104 in accordance with planned motion trajectory.

Figure 5:
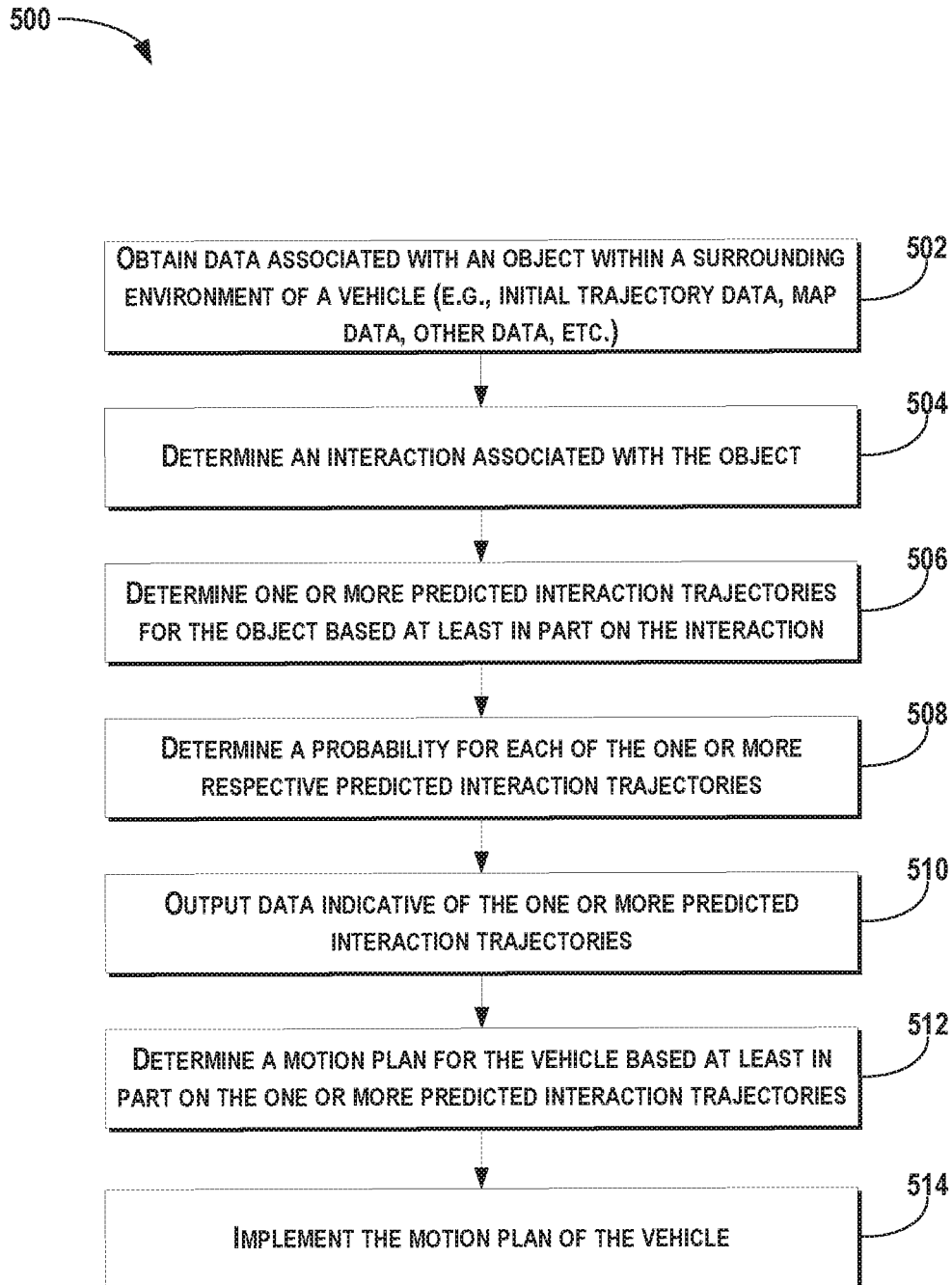
FIG. 5 depicts a flow diagram of an example method for determining object motion according to example embodiments of the present disclosure.

FIG. 5 depicts a flow diagram of another example method 500 for determining object motion and controlling vehicle motion according to example embodiments of the present disclosure. One or more portion(s) of the method 500 can be implemented by one or more computing devices such as, for example, the one or more computing device(s) of the vehicle computing system 102 and/or other systems. Each respective portion of the method 500 can be performed by any (or any combination) of the one or more computing devices. Moreover, one or more portion(s) of the method 500 can be implemented as an algorithm on the hardware components of the device(s) described herein (e.g., as in FIGS. 1 and 6), for example, to determine object motion and control a vehicle with respect to the same. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining data associated with an object within a surrounding environment of a vehicle. For instance, the vehicle computing system 102 can obtain data associated with a first object and one or more second objects within a surrounding environment of a vehicle 104. In some implementations, the vehicle computing system 102 can obtain data indicative of an initial predicted trajectory of a first object 202 and/or the one or more second objects (e.g., object 208) within a surrounding environment of the vehicle 104. In some implementations, the vehicle computing system 102 can obtain state data 130 indicative of one or more current or past states of a first object 202 and one or more second objects within a surrounding environment. The vehicle computing system 102 can determine an initial predicted trajectory 206 of the first object 202 within the surrounding environment based at least in part on the state data 130 indicative of the one or more current or past states of the first object 202 and/or one or more initial predicted trajectories of the second object(s) within the surrounding environment based at least in part on the state data 130 indicative of the one or more current or past states of the second object(s).

At (504), the method 500 can include determining an interaction associated with the object. For instance, the vehicle computing system 102 can determine an interaction between the first object 202 and the one or more second objects (e.g., object 208) based at least in part, on the initial predicted trajectory 206 of the first object 202 and/or the one or more initial predicted trajectories of the one or more second objects, within the surrounding environment of the vehicle 104. For example, the vehicle computing system 104 can determine that two objects may interact in the event that the respective trajectories of each object would intersect or overlap. In some implementations, the vehicle computing system 102 can determine the interaction between the first object 202 and the one or more second objects based at least in part on a machine-learned model.

At (506), the method 500 can include determining one or more predicted interaction trajectories for an object based at least in part on the interaction. For instance, the vehicle computing system 102 can determine one or more predicted interaction trajectories 220A-B of the first object 202 within the surrounding environment based at least in part on the interaction between the first object 202 and the one or more second objects. As described herein, the vehicle computing system 102 can determine the predicted interaction trajectories based on a rule(s)-based model, a machine-learned model, a graph model, sensor data, etc.

At (508), the method 500 can determine a probability for each of the one or more respective predicted interaction trajectories. For instance, the vehicle computing system 102 can determining a probability for each of the respective one or more predicted interaction trajectories. The probability for the respective interaction trajectory can be indicative of a likelihood of the first object 202 acting in accordance with the respective predicted interaction trajectory. By way of example, the vehicle computing system 102 can iteratively determine the one or more predicted interaction trajectories 220A-B of the first object 202 within the surrounding environment. The vehicle computing system 102 can determine, for each of the one or more predicted interaction trajectories 220A-B, a likelihood that the first object 202 will act in accordance with the respective predicted interaction trajectory. As described herein, the vehicle computing system 102 can determine a score for each of the one or more predicted interaction trajectories 220A-B based at least in part on the probability for each of the respective one or more predicted interaction trajectories 220A-B.

At (510), the method 500 can include outputting data indicative of the one or more predicted interaction trajectories. For instance, the vehicle computing system 102 can output data indicative of the one or more predicted interaction trajectories 220A-B of the first object 202. Such data can be outputted from the prediction system 126 to the motion planning system 128 and/or outputted to a memory (e.g., onboard the vehicle 104). The vehicle computing system 102 can determine a motion plan for the vehicle based at least in part on the one or more predicted interaction trajectories, at (512). For example, the vehicle computing system 102 can consider each of the predicted interaction trajectories for the first object 202 when determining the motion plan for the vehicle 104 (e.g., as part of its cost data analysis). The vehicle computing system 102 can implement the motion plan, at (514). For instance, the vehicle computing system 102 can cause the vehicle 104 to initial a motion in accordance with at least a portion of the motion plan.

FIG. 6 depicts example system components of an example system 600 according to example embodiments of the present disclosure. The example system 600 can include the vehicle computing system 102, the operations computing system 106, and a machine learning computing system 630 that are communicatively coupled over one or more network(s) 680.

The vehicle computing system 102 can include one or more computing device(s) 601. The computing device(s) 601 of the vehicle computing system 102 can include processor(s) 602 and a memory 604 (e.g., onboard the vehicle 104). The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be obtained by the one or more processors 602. For instance, the memory 604 (e.g., one or more non-transitory computer-readable storage mediums, memory devices) can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 can store instructions 606 that when executed by the one or more processors 602 cause the one or more processors 602 (the computing system 102) to perform operations such as any of the operations and functions of the vehicle computing system 102, the vehicle 104, or for which the vehicle computing system 102 is configured, as described herein, the operations for determining object motion and controlling a vehicle (e.g., one or more portions of method 500), and/or any other operations and functions for the vehicle computing system 102, as described herein.

The memory 604 can store data 608 that can be obtained (e.g., received, accessed, written, manipulated, generated, created, etc.) and/or stored. The data 608 can include, for instance, sensor data, state data, prediction data, data indicative of interactions, data indicative of policies, data indicative of graph models, data indicative of rule(s)-based models, data indicative of machine-learned model(s), input data, output data, data indicative of predicted interaction trajectories, data indicative of motion plans, map data, and/or other data/information described herein. In some implementations, the computing device(s) 601 can obtain data from one or more memory device(s) that are remote from the vehicle 104.

The computing device(s) 601 can also include a communication interface 609 used to communicate with one or more other system(s) on-board the vehicle 104 and/or a remote computing device that is remote from the vehicle 104 (e.g., the other systems of FIG. 6, etc.). The communication interface 609 can include any circuits, components, software, etc. for communicating via one or more networks (e.g., 680). In some implementations, the communication interface 609 can include, for example, one or more of a communications controller, receiver, transceiver, transmitter, port, conductors, software and/or hardware for communicating data/information.

The operations computing system 106 can perform the operations and functions for managing vehicles (e.g., a fleet of autonomous vehicles) and/or otherwise described herein. The operations computing system 106 can be located remotely from the vehicle 104. For example, the operations computing system 106 can operate offline, off-board, etc. The operations computing system 106 can include one or more distinct physical computing devices.

The operations computing system 106 can include one or more computing devices 620. The one or more computing devices 620 can include one or more processors 622 and a memory 624. The one or more processors 622 can be any suitable processing device (e.g., a processor core, a microprocessor, an ASIC, a FPGA, a controller, a microcontroller, etc.) and can be one processor or a plurality of processors that are operatively connected. The memory 624 can include one or more non-transitory computer-readable storage media, such as RAM, ROM, EEPROM, EPROM, one or more memory devices, flash memory devices, etc., and combinations thereof.

The memory 624 can store information that can be accessed by the one or more processors 622. For instance, the memory 624 (e.g., one or more non-transitory computer-readable storage mediums, memory devices) can store data 626 that can be obtained, received, accessed, written, manipulated, created, and/or stored. The data 626 can include, for instance, data indicative of model(s), data associated with vehicle(s), and/or other data or information described herein, in some implementations, the operations computing system 106 can obtain data from one or more memory device(s) that are remote from the operations computing system 106.

The memory 624 can also store computer-readable instructions 628 that can be executed by the one or more processors 622. The instructions 628 can be software written in any suitable programming language or can be implemented in hardware. Additionally, or alternatively, the instructions 628 can be executed in logically and/or virtually separate threads on processor(s) 622. For example, the memory 624 can store instructions 628 that when executed by the one or more processors 622 cause the one or more processors 622 to perform any of the operations and/or functions of the operations computing system 106 and/or other operations and functions.

The computing device(s) 620 can also include a communication interface 629 used to communicate with one or more other system(s). The communication interface 629 can include any circuits, components, software, etc. for communicating via one or more networks (e.g., 680). In some implementations, the communication interface 629 can include for example, one or more of a communications controller, receiver, transceiver, transmitter, port, conductors, software and/or hardware for communicating data/information.

According to an aspect of the present disclosure, the vehicle computing system 102 and/or the operations computing system 106 can store or include one or more machine-learned models 640. As examples, the machine-learned models 640 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks. The machine-learned models 640 can include the model 302 and/or other model(s), as described herein.

In some implementations, the vehicle computing system 102 and/or the operations computing system 106 can receive the one or more machine-learned models 640 from the machine learning computing system 630 over the network(s) 680 and can store the one or more machine-learned models 640 in the memory of the respective system. The vehicle computing system 102 and/or the operations computing system 106 can use or otherwise implement the one or more machine-learned models 640 (e.g., by processor(s) 602, 622). In particular, the vehicle computing system 102 and/or the operations computing system 106 can implement the machine learned model(s) 640 to determine object interaction(s) and/or predicted interaction trajectories, as described herein.

The machine learning computing system 630 can include one or more processors 632 and a memory 634. The one or more processors 632 can be any suitable processing device (e.g., a processor core, a microprocessor, an ASIC, a FPGA, a controller, a microcontroller, etc.) and can be one processor or a plurality of processors that are operatively connected. The memory 634 can include one or more non-transitory computer-readable storage media, such as RAM, ROM, EEPROM, EPROM, one or more memory devices, flash memory devices, etc., and combinations thereof.

The memory 634 can store information that can be accessed by the one or more processors 632. For instance, the memory 634 (e.g., one or more non-transitory computer-readable storage mediums, memory devices) can store data 636 that can be obtained, received, accessed, written, manipulated, created, and/or stored. In some implementations, the machine learning computing system 630 can obtain data from one or more memory devices that are remote from the machine learning computing system 630.

The memory 634 can also store computer-readable instructions 638 that can be executed by the one or more processors 632. The instructions 638 can be software written in any suitable programming language or can be implemented in hardware. Additionally, or alternatively, the instructions 638 can be executed in logically and/or virtually separate threads on processor(s) 632. The memory 634 can store the instructions 638 that when executed by the one or more processors 632 cause the one or more processors 632 to perform operations. The machine learning computing system 630 can include a communication system 639, including devices and/or functions similar to that described with respect to the vehicle computing system 102 and/or the operations computing system 106.

In some implementations, the machine learning computing system 630 can include one or more server computing devices. If the machine learning computing system 630 includes multiple server computing devices, such server computing devices can operate according to various computing architectures, including, for example, sequential computing architectures, parallel computing architectures, or some combination thereof In addition or alternatively to the model(s) 640 at the vehicle computing system 102 and/or the operations computing system 106, the machine learning computing system 630 can include one or more machine-learned models 650. As examples, the machine-learned models 650 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory) recurrent neural networks, or other forms of neural networks. The machine-learned models 650 can be similar to and/or the same as the machine-learned models 640.

As an example, the machine learning computing system 630 can communicate with the vehicle computing system 102 and/or the operations computing system 106 according to a client-server relationship. For example, the machine learning computing system 630 can implement the machine-learned models 650 to provide a web service to the vehicle computing system 102 and/or the operations computing system 106. For example, the web service can provide machine-learned models to an entity associated with a vehicle; such that the entity can implement the machine-learned model (e.g., to predict object motion within a surrounding environment of a vehicle. etc.). Thus, machine-learned models 650 can be located and used at the vehicle computing system 102 and/or the operations computing system 106 and/or machine-learned models 650 can be located and used at the machine learning computing system 630.

In some implementations, the machine learning computing system 630, the vehicle computing system 102, and/or the operations computing system 106 can train the machine-learned models 640 and/or 650 through use of a model trainer 660. The model trainer 660 can train the machine-learned models 640 and/or 650 using one or more training or learning algorithms. One example training technique is backwards propagation of errors. In some implementations, the model trainer 660 can perform supervised training techniques using a set of labeled training data. In other implementations, the model trainer 660 can perform unsupervised training techniques using a set of unlabeled training data. The model trainer 660 can perform a number of generalization techniques to improve the generalization capability of the models being trained. Generalization techniques include weight decays, dropouts, or other techniques.

In particular, the model trainer 660 can train a machine-learned model 640 and/or 650 based on a set of training data 662. The training data 662 can include, for example, a number of sets of data from previous events (e.g., driving log data associated with previously observed interactions). In some implementations, the training data 662 can include data indicative of interactions and/or predicted interaction trajectories determined using a rule(s)-based algorithm. In some implementations, the training data 662 can be taken from the same vehicle as that which utilizes that model 640/650. In this way, the models 640/650 can be trained to determine outputs in a manner that is tailored to that particular vehicle. Additionally, or alternatively, the training data 662 can be taken from one or more different vehicles than that which is utilizing that model 640/650. The model trainer 660 can be implemented in hardware, firmware, and/or software controlling one or more processors.

The network(s) 680 can be any type of network or combination of networks that allows for communication between devices. In some embodiments, the network(s) 680 can include one or more of a local area network, wide area network, the Internet, secure network, cellular network, mesh network, peer-to-peer communication link and/or some combination thereof and can include any number of wired or wireless links. Communication over the network(s) 680 can be accomplished, for instance, via a network interface using any type of protocol, protection scheme, encoding, format, packaging, etc.

FIG. 6 illustrates one example system 600 that can be used to implement the present disclosure. Other computing systems can be used as well. For example, in some implementations, the vehicle computing system 102 and/or the operations computing system 106 can include the model trainer 660 and the training dataset 662. In such implementations, the machine-learned models 640 can be both trained and used locally at the vehicle computing system 102 and/or the operations computing system 106. As another example, in some implementations, the vehicle computing system 102 and/or the operations computing system 106 may not be connected to other computing systems.

Computing tasks discussed herein as being performed at computing devices) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
   one or more processors; and
   one or more tangible, non-transitory, computer readable media that collectively store instructions that when executed by the one or more processors cause the computing system to perform operations comprising:
   obtaining data associated with a first object and one or more second objects within a surrounding environment of an autonomous vehicle;
   determining an interaction between the first object and the one or more second objects based at least in part on the data associated with the first object and the one or more second objects, wherein the interaction between the first object and the one or more second objects is determined based at least in part on map data associated with the surrounding environment of the autonomous vehicle;
   determining one or more predicted trajectories of the first object within the surrounding environment based at least in part on the interaction between the first object and the one or more second objects; and
   outputting data indicative of the one or more predicted trajectories of the first object.

2. The computing system of claim 1, wherein the data associated with the first object and the one or more second objects within the surrounding environment comprises data indicative of an initial predicted trajectory of the first object within the surrounding environment.

3. The computing system of claim 2, further comprising:
   obtaining state data indicative of one or more current or past states of the first object within the surrounding environment; and
   determining the initial predicted trajectory of the first object based at least in part on the state data indicative of the one or more current or past states of the first object within the surrounding environment.

4. The computing system of claim 2, wherein determining the interaction between the first object and the one or more second objects comprises:
   determining the interaction between the first object and the one or more second objects based at least in part on the initial predicted trajectory of the first object.

5. The computing system of claim 1, wherein the operations further comprise:
   determining a probability for each of the respective one or more predicted trajectories, wherein the probability is indicative of a likelihood of the first object acting in accordance with the respective predicted trajectory.

6. The computing system of claim 1, wherein determining the one or more predicted trajectories of the first object within the surrounding environment comprises:
   obtaining data indicative of a machine-learned interaction prediction model;
   inputting the data associated with the first object and the one or more second objects into the machine-learned interaction prediction model; and
   obtaining an output from the machine-learned interaction prediction model, wherein the output is indicative of the one or more predicted trajectories of the first object within the surrounding environment.

7. The computing system of claim 1, wherein the interaction is associated with a traffic rule.

8. The computing system of claim 1, wherein the one or more second objects include a static object within the surrounding environment.

9. The computing system of claim 1, wherein the one or more second objects include an actor object within the surrounding environment.

10. The computing system of claim 1, wherein the one or more second objects include the autonomous vehicle.

11. The computing system of claim 1,
wherein determining the interaction between the first object and the one or more second objects comprises determining that a first predicted trajectory of the first object is in conflict with one or more second predicted trajectories of the one or more second objects, and
wherein determining the one or more predicted trajectories of the first object within the surrounding environment comprises in response to determining that the first predicted trajectory of the first object is in conflict with the one or more second predicted trajectories of the one or more second objects, determining the one or more predicted trajectories of the first object such that the one or more predicted trajectories of the first object are not in conflict with the one or more second predicted trajectories of the one or more second objects.

12. The computing system of claim 1,
wherein determining the interaction between the first object and the one or more second objects comprises associating the first object with the one or more second objects using a graph model, and
wherein determining one or more predicted trajectories of the first object within the surrounding environment comprises after associating the first object with the one or more second objects, determining the one or more predicted trajectories of the first object based on the graph model.

13. An autonomous vehicle comprising:
one or more processors; and
one or more tangible, non-transitory, computer readable media that collectively store instructions that when executed by the one or more processors cause a computing system to perform operations comprising:
obtaining state data indicative of one or more current or past states of a first object and one or more second objects within a surrounding environment;
determining an initial predicted trajectory of the first object within the surrounding environment based at least in part on the state data indicative of the one or more current or past states of the first object;
determining an interaction between the first object and the one or more second objects based at least in part on the initial predicted trajectory of the first object, wherein the interaction between the first object and the one or more second objects is determined based at least in part on map data associated with the surrounding environment; and
determining one or more predicted trajectories of the first object within the surrounding environment based at least in part on the interaction between the first object and the one or more second objects.

14. The autonomous vehicle of claim 13, wherein the operations further comprise:
determining a motion plan for the autonomous vehicle based at least in part on the one or more predicted trajectories of the first object within the surrounding environment; and
causing the autonomous vehicle to initiate a motion in accordance with at least a portion of the motion plan.

15. The autonomous vehicle of claim 13, wherein the operations further comprise:
determining a probability for each of the respective one or more predicted trajectories, wherein the probability for the respective predicted trajectory is indicative of a likelihood of the first object acting in accordance with the respective predicted trajectory.

16. The autonomous vehicle of claim 15, wherein the operations further comprise:
determining a score for each of the one or more predicted interaction trajectories based at least in part on the probability for each of the respective one or more predicted interaction trajectories.

17. The autonomous vehicle of claim 13, wherein determining the interaction between the first object and the one or more second objects comprises:
determining the interaction between the first object and the one or more second objects based at least in part on a machine-learned model.

18. A computer-implemented method for determining object motion, comprising:
obtaining, by a computing system comprising one or more computing devices, data indicative of an initial predicted trajectory of a first object within a surrounding environment of an autonomous vehicle;
determining, by the computing system, an interaction between the first object and one or more second objects based at least in part on the initial predicted trajectory of the first object within the surrounding environment of the autonomous vehicle, wherein the interaction between the first object and the one or more second objects is determined based at least in part on map data associated with the surrounding environment of the autonomous vehicle;
determining, by the computing system, one or more predicted trajectories of the first object within the surrounding environment based at least in part on the interaction between the first object and the one or more second objects; and
outputting, by the computing system, data indicative of the one or more predicted trajectories of the first object.

19. The computer-implemented method of claim 18, wherein determining, by the computing system, the one or more predicted trajectories of the first object comprises:
iteratively determining, by the computing system, the one or more predicted trajectories of the first object within the surrounding environment; and
determining for each of the one or more predicted trajectories, by the computing system, a likelihood that the first object will act in accordance with the respective predicted trajectory.

20. A computing system, comprising:
one or more processors; and
one or more tangible, non-transitory, computer readable media that collectively store instructions that when executed by the one or more processors cause the computing system to perform operations comprising:
obtaining data associated with a first object and one or more second objects within a surrounding environment of an autonomous vehicle;
determining an interaction between the first object and the one or more second objects based at least in part on the data associated with the first object and the one or more second objects;
determining one or more predicted trajectories of the first object within the surrounding environment based at least in part on the interaction between the first object and the one or more second objects;

determining a probability for each of the respective one or more predicted trajectories, wherein the probability is indicative of a likelihood of the first object acting in accordance with the respective predicted trajectory; and outputting data indicative of the one or more predicted trajectories of the first object.

21. A computing system, comprising:
one or more processors; and
one or more tangible, non-transitory, computer readable media that collectively store instructions that when executed by the one or more processors cause the computing system to perform operations comprising:
obtaining data associated with a first object and one or more second objects within a surrounding environment of an autonomous vehicle;
determining an interaction between the first object and the one or more second objects based at least in part on the data associated with the first object and the one or more second objects;
determining one or more predicted trajectories of the first object within the surrounding environment based at least in part on the interaction between the first object and the one or more second objects wherein determining the one or more predicted trajectories of the first object within the surrounding environment comprises:
obtaining data indicative of a machine-learned interaction prediction model,
inputting the data associated with the first object and the one or more second objects into the machine-learned interaction prediction model, and
obtaining an output from the machine-learned interaction prediction model, wherein the output is indicative of the one or more predicted trajectories of the first object within the surrounding environment; and
outputting data indicative of the one or more predicted trajectories of the first object.

22. A computing system, comprising:
one or more processors; and
one or more tangible, non-transitory, computer readable media that collectively store instructions that when executed by the one or more processors cause the computing system to perform operations comprising:
obtaining data associated with a first object and one or more second objects within a surrounding environment of an autonomous vehicle;
determining an interaction between the first object and the one or more second objects based at least in part on the data associated with the first object and the one or more second objects, wherein determining the interaction between the first object and the one or more second objects comprises determining that a first predicted trajectory of the first object is in conflict with one or more second predicted trajectories of the one or more second objects;
determining one or more predicted trajectories of the first object within the surrounding environment based at least in part on the interaction between the first object and the one or more second objects, wherein determining the one or more predicted trajectories of the first object within the surrounding environment comprises in response to determining that the first predicted trajectory of the first object is in conflict with the one or more second predicted trajectories of the one or more second objects, determining the one or more predicted trajectories of the first object such that the one or more predicted trajectories of the first object are not in conflict with the one or more second predicted trajectories of the one or more second objects; and
outputting data indicative of the one or more predicted trajectories of the first object.

23. A computing system, comprising:
one or more processors; and
one or more tangible, non-transitory, computer readable media that collectively store instructions that when executed by the one or more processors cause the computing system to perform operations comprising:
obtaining data associated with a first object and one or more second objects within a surrounding environment of an autonomous vehicle;
determining an interaction between the first object and the one or more second objects based at least in part on the data associated with the first object and the one or more second objects, wherein determining the interaction between the first object and the one or more second objects comprises associating the first object with the one or more second objects using a graph model;
determining one or more predicted trajectories of the first object within the surrounding environment based at least in part on the interaction between the first object and the one or more second objects, wherein determining one or more predicted trajectories of the first object within the surrounding environment comprises after associating the first object with the one or more second objects, determining the one or more predicted trajectories of the first object based on the graph model; and
outputting data indicative of the one or more predicted trajectories of the first object.

24. An autonomous vehicle comprising:
one or more processors; and
one or more tangible, non-transitory, computer readable media that collectively store instructions that when executed by the one or more processors cause a computing system to perform operations comprising:
obtaining state data indicative of one or more current or past states of a first object and one or more second objects within a surrounding environment;
determining an initial predicted trajectory of the first object within the surrounding environment based at least in part on the state data indicative of the one or more current or past states of the first object;
determining an interaction between the first object and the one or more second objects based at least in part on the initial predicted trajectory of the first object;
determining one or more predicted trajectories of the first object within the surrounding environment based at least in part on the interaction between the first object and the one or more second objects; and
determining a probability for each of the respective one or more predicted trajectories, wherein the probability for the respective predicted trajectory is indicative of a likelihood of the first object acting in accordance with the respective predicted trajectory.

25. An autonomous vehicle comprising:
one or more processors; and
one or more tangible, non-transitory, computer readable media that collectively store instructions that when executed by the one or more processors cause a computing system to perform operations comprising:
obtaining state data indicative of one or more current or past states of a first object and one or more second objects within a surrounding environment;

determining an initial predicted trajectory of the first object within the surrounding environment based at least in part on the state data indicative of the one or more current or past states of the first object;

determining an interaction between the first object and the one or more second objects based at least in part on the initial predicted trajectory of the first object; and determining a score for each of the one or more predicted interaction trajectories based at leak in part on the probability for each of the respective one or more predicted interaction trajectories.

26. A computer-implemented method for determining object motion, comprising:

obtaining, by a computing system comprising one or more computing devices, data indicative of an initial predicted trajectory of a first object within a surrounding environment of an autonomous vehicle;

determining, by the computing system, an interaction between the first object and one or more second objects based at least in part on the initial predicted trajectory of the first object within the surrounding environment of the autonomous vehicle;

determining, by the computing system, one or more predicted trajectories of the first object within the surrounding environment based at least in part on the interaction between the first object and the one or more second objects, wherein determining the one or more predicted trajectories of the first object comprises:

iteratively determining, by the computing system, the one or more predicted trajectories of the first object within the surrounding environment, and determining for each of the one or more predicted trajectories, by the computing system, a likelihood that the first object will act in accordance with the respective predicted trajectory; and outputting, by the computing system, data indicative of the one or more predicted trajectories of the first object.

* * * * *